United States Patent [19]

Yemini

[11] Patent Number: 5,797,488

[45] Date of Patent: Aug. 25, 1998

[54] CASE FOR A CIRCULAR SAW

[75] Inventor: Zvi Yemini, Tel Aviv, Israel

[73] Assignee: Zag Ltd., Rosh Haayin, Israel

[21] Appl. No.: 700,908

[22] Filed: Aug. 21, 1996

[51] Int. Cl.$^6$ .................................................. A45C 11/26
[52] U.S. Cl. ......................... 206/349; 206/576; 220/529
[58] Field of Search ................................. 206/349, 372, 206/373, 576, 564; 220/531, 529; 190/102, 110

[56] References Cited

U.S. PATENT DOCUMENTS

| | | | |
|---|---|---|---|
| 3,261,454 | 7/1966 | Elson et al. | 206/349 |
| 4,454,949 | 6/1984 | Flum | 206/564 |
| 4,611,713 | 9/1986 | Byrns | 206/373 |
| 4,811,998 | 3/1989 | Rankin | 206/372 |
| 4,984,687 | 1/1991 | Hanna et al. | 206/373 |
| 5,409,560 | 4/1995 | Hammer et al. | 206/373 |
| 5,425,450 | 6/1995 | Lin | 206/310 |
| 5,425,451 | 6/1995 | Blase | 206/309 |

*Primary Examiner*—Paul T. Sewell
*Assistant Examiner*—Nhan T. Lam
*Attorney, Agent, or Firm*—Mark M. Friedman

[57] ABSTRACT

A case for a circular saw, including a pivotable compartment for holding at least one blade. When the compartment is closed, at least a portion of the compartment is accommodated by a recess of the base. In this position, access to the interior of the compartment is restricted, such that a blade may not be removed from, or placed in, the compartment. A lock may be used to keep the compartment in this position. When access to the compartment is desired, the compartment may be pivoted, so that at least a portion of the compartment is projecting outwardly, substantially horizontally, from the base. In this open position, access to the compartment is permitted, and at least one blade may be placed in, or removed from, the compartment.

5 Claims, 4 Drawing Sheets

CASE FOR A CIRCULAR SAW

FIELD AND BACKGROUND OF THE INVENTION

The present invention relates to a case for a circular saw and, more particularly, to a case for a circular saw which includes at least one compartment for storing a saw blade.

A circular saw is a tool which has many uses, both commercially and around the home. It is referred to as a "circular saw" because the blade of the saw is disk-shaped. These saws are typically stored and transported in a case, for convenience, to protect the saw itself from damage, and to protect the user from injury. A conventional circular saw case has a base, and a cover which securely fits onto the base, to prevent the saw and the accessories from being inadvertently spilled from the case. Such a conventional case usually includes a handle, for carrying the case. The interior of the case includes an area which is designed to hold the saw, and storage space for accessories, such as extra blades. A extra blade, that is, a blade not attached to the circular saw, is necessary because blades with different cutting edges may be required for different applications. However, these blades have sharp edges, and can easily injure the user. Thus, extra blades should be securely held by the case, to prevent user injury, and to prevent damage to the blades themselves.

Unfortunately, a conventional case for a circular saw generally does not hold extra blades securely, nor does a conventional case provide safe and convenient access to these blades, so that they are available when needed, yet do not cause injury to user. In a conventional case, the storage space for blades is usually in the form of a pocket attached to an interior surface of the case, or in the form of a side compartment formed in an interior surface of the case. Both of these conventional designs have a number of flaws. First, extra blades may shift during transport of the case, and actually fall out of their storage area, so that they spill from the case when the case is opened, potentially injuring the user. Second, the conventional case must be opened for access to the storage area for extra blades, which can be very inconvenient. Third, the storage area typically does not securely store a plurality of extra blades. Either storage is only provided for one blade, or multiple blades are simply stacked, one on top of the other. Providing storage space for only a single blade is inconvenient, since more than one extra blade may be needed. However, stacking extra blades is potentially dangerous, since the notched edges of one blade may become hooked on another blade, risking both damage to the blades when one is removed, and injury to the user, who must carefully separate the blades. Thus, conventional circular saw cases do not provide safe and convenient storage for, and access to, extra blades.

There is thus a widely recognized need for, and it would be highly advantageous to have, a case for a circular saw which provides safe and convenient storage for, and access to, spare blades.

SUMMARY OF THE INVENTION

According to the present invention there is provided a case for storing a circular saw and extra blades, including: (a) a cover; (b) a base hingeably connected to the cover, said base featuring a recess; and (c) a compartment, the compartment being dimensioned to accommodate at least one of the extra blades, the compartment being pivotably mounted on the base, and the compartment being dimensioned to be accommodated by the recess, such that when the compartment is closed, at least a portion of the compartment is accommodated by the recess, and when the compartment is open, at least a portion of the compartment projects outwardly, substantially horizontally, from said base. Preferably, the entire compartment is accommodated by the recess when the compartment is closed, and the entire compartment projects outwardly from the base when the compartment is open.

According to further features in a preferred embodiment of the present invention, the compartment further includes a lock, the lock featuring a releasable tab, the tab projecting from the compartment, and the tab releasably engaging the base.

According to still further features in a preferred embodiment of the present invention, the compartment is dimensioned to accommodate at least one blade of preferably seven and one-quarter inches diameter. Preferably, the compartment is dimensioned to accommodate two blades. The compartment preferably further features: (a) a seat; (b) a spacer for separating the blades, the spacer including an opening; and (c) a tightener for securing the blades, the tightener being dimensioned to be accommodated by the opening of the spacer and by the seat of the compartment. The compartment may further preferably include a handle.

The present invention successfully addresses the shortcomings of the presently known configurations by providing a case for a circular saw which provides safe and convenient storage for, and access to, spare blades. More specifically, the present invention provides a case with a pivotable compartment, the interior of which provides a storage space for at least one blade.

The case includes a cover and a base. The base is hingeably connected to the cover. The base includes a recess, which is dimensioned to accommodate a compartment. The compartment is dimensioned to accommodate at least one circular saw blade, and is pivotably mounted on the base. When the compartment is in a closed position, at least a portion of the compartment is accommodated by the recess in the base of the case, and access to the interior of the compartment is restricted, so that a blade may not be placed in, or removed from, the compartment. The closed position protects both the blade from damage and the user from being injured by the blade. The compartment may be secured in this position by a lock, so that the compartment does not accidentally move.

When free access to the interior of the compartment is desired, the compartment may then be pivoted about the pivot, so that it is in an open position. In this open position, at least a portion of the compartment is projecting outwardly from the base of the case, in a substantially horizontal orientation, and a blade may be easily removed from the interior of the compartment, or placed in the interior of the compartment. Preferably, the compartment includes a handle, which is attached to the compartment, for easy movement of the compartment. Hereinafter, "attached to" is defined as connected to, or integrally formed with.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a case for a circular saw, which can be used to store and transport both a circular saw, and extra blades and other accessories. Specifically, the present invention includes a pivotable compartment, which can be used to hold at least one extra blade. This compartment is pivotably mounted to the base of the case, and is dimensioned to be accommodate d by a recess in the base of the case. When the compartment is closed, at least a portion of the compartment, and preferably substantially the entirety of the compartment, is accommodated by the recess. In the closed position, access to the interior of the compartment is restricted, so that an extra blade may not be placed in, or removed from, the compartment. The compartment may be held in this position by a lock. When access to the interior of the compartment is desired, the compartment can be pivoted about the pivot, such that the compartment is projecting outwardly, substantially horizontally, from the base of the case. In this open position, convenient, safe access to the extra blade is provided.

The terms "base", or "base of the case", denote the portion of the case which accommodates at least a portion of the compartment, when the compartment is closed, and access to the interior of the compartment is restricted, such that a blade may not be placed in, or removed from, the compartment.

The principles and operation of a circular saw case, according to the present invention, may be better understood with reference to the drawings and the accompanying description.

Figure 1:
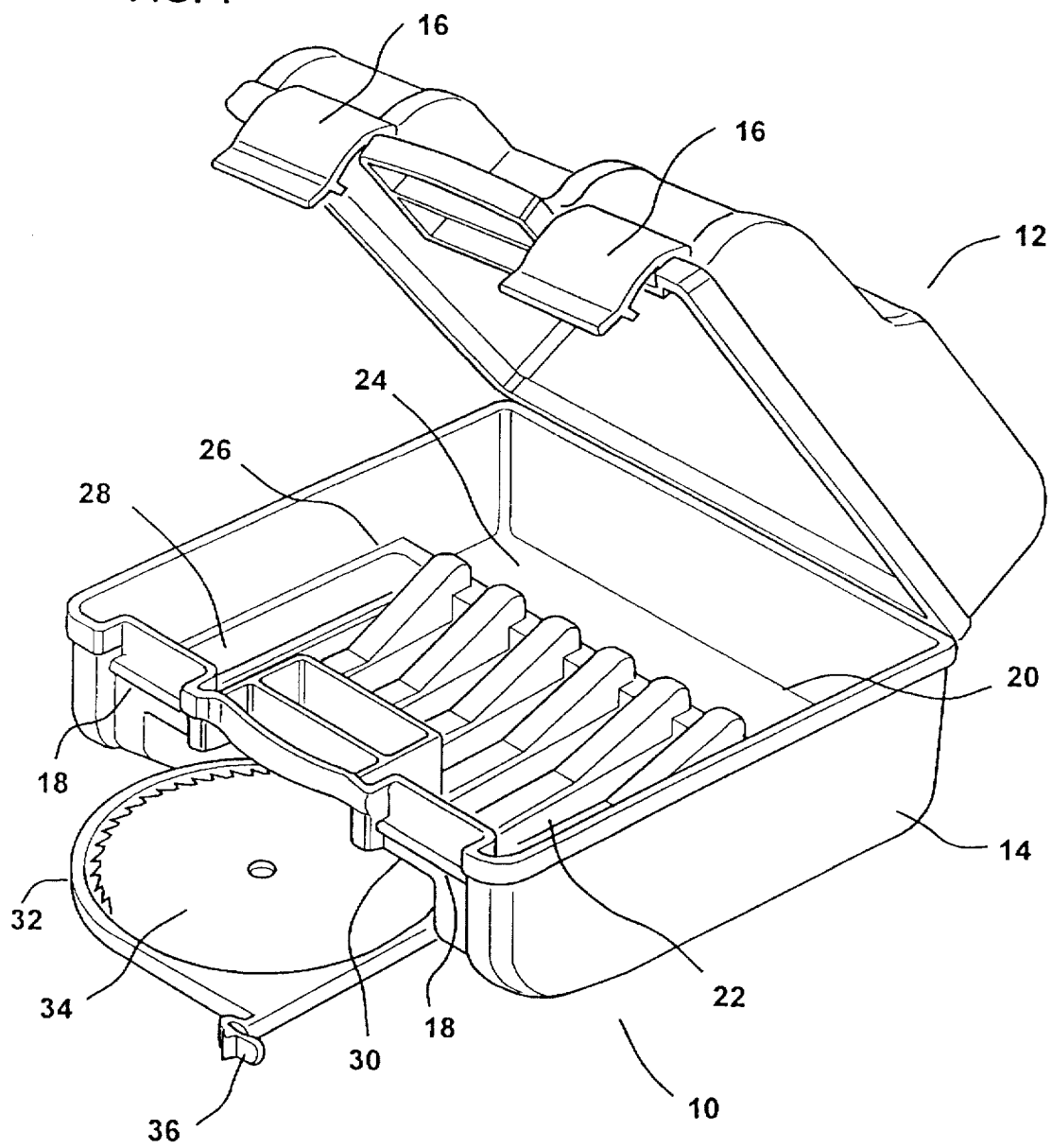
FIG. 1 is a front view of an illustrative case for a circular saw according to the present invention, with both the cover and the compartment open.

Referring now to the drawings, FIG. 1 illustrates a circular saw case of the present invention, with an open cover and an open pivotable compartment. A case 10 is shown. A cover 12 is hingeably connected to a base 14 along one of their respective edges, so that access to the interior of case 10 is alternately blocked or permitted. Preferably, two latches 16 on cover 12 are dimensioned to engage their respective latch seats 18, so that cover 12 is held securely against base 14 when latches 16 have engaged latch seats 18. Optionally, an interior surface 20 of base 14 is formed with a platform 22 and a well 24. Platform 22 preferably includes a plurality of projections 26, which are taller at the end which is closer to well 24. The handle of the circular saw (not shown) rests on platform 22, and the blade holder (not shown) rests substantially within well 24, such that the movement of the circular saw is restricted (see FIG. 4 for an illustration of case 10 with a circular saw). Next to platform 22 is an optional accessory bin 28, which can be used to store guides, cable, fittings, other tools, and the like.

Base 14 is formed with a recess 30, which is dimensioned to accommodate a pivotable, blade storage compartment 32. Compartment 32 is dimensioned for convenient storage of at least one blade 34. Preferably, compartment 32 is dimensioned to accommodate at least one blade 34 which is substantially 7¼ inches in diameter. Most preferably, compartment 32 is dimensioned to accommodate two blades 34.

Compartment 32 is pivotably mounted on base 14, so that compartment 32 may be alternately opened and closed. When compartment 32 is closed, at least a portion of compartment 32 is accommodated by recess 30, and access to compartment 32 is restricted, so that blade 34 cannot be placed in, or removed from, compartment 32. When free access to the interior of compartment 32 is desired, compartment 32 may be pivoted, so that compartment 32 is opened. When compartment 32 is open, at least a portion of compartment 32 projects outwardly, substantially horizontally, from base 14, so that blade 34 may be placed in, or removed from, compartment 32. Preferably the entirety of compartment 32 projects outwardly from base 14 when compartment 32 is open. Compartment 32 preferably has a handle 36, for easy movement of compartment 32.

Figure 2:
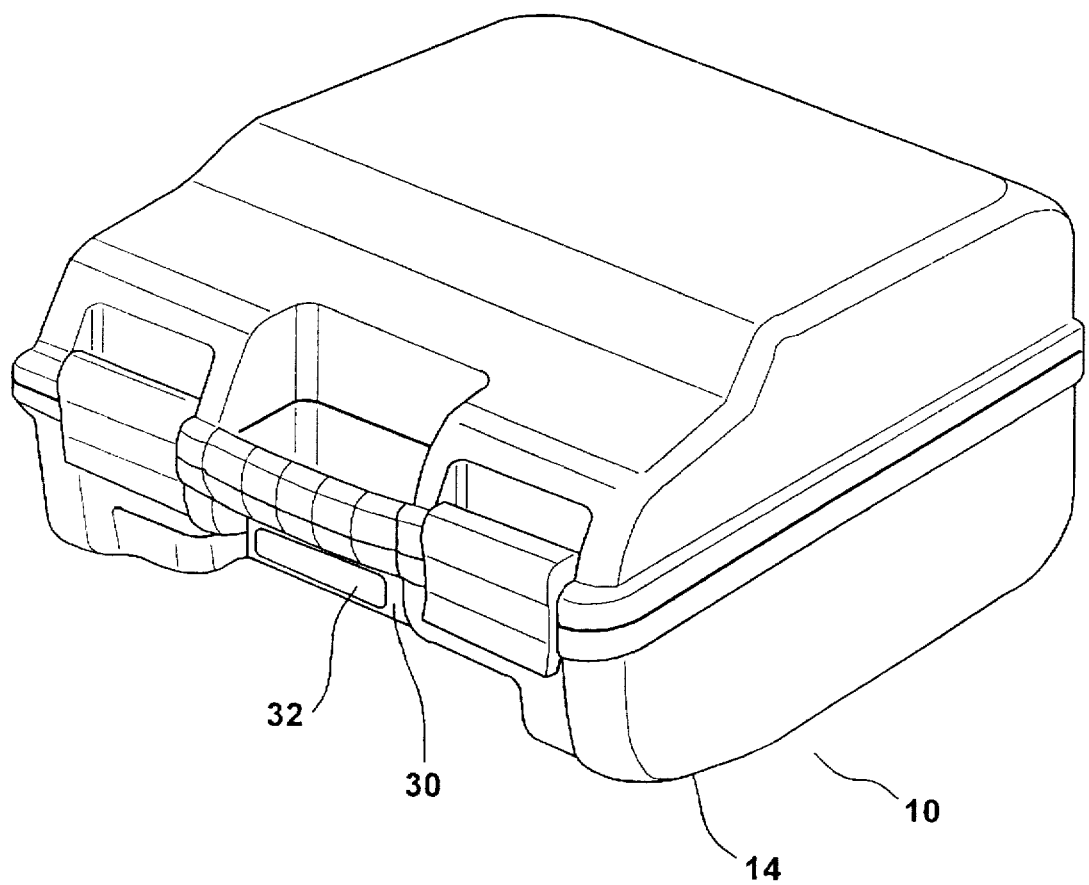
FIG. 2 is a view of the case of FIG. 1, showing both the cover and the compartment of the case closed.

FIG. 2 shows case 10 of FIG. 1 with a closed compartment 32. When compartment 32 is closed, at least a portion of compartment 32 is accommodated by recess 30. In the preferred embodiment shown, substantially he entirety of compartment 32 is accommodated by recess 30, when compartment 32 is closed. In this position, access to compartment 32 is restricted, so that blade 34 (not shown) cannot be removed from, or placed in, compartment 32. When compartment 32 is closed, blade 34 is safely stored and transported, since blade 34 is protected from damage, and the user is protected from injury by blade 34.

Figure 3:
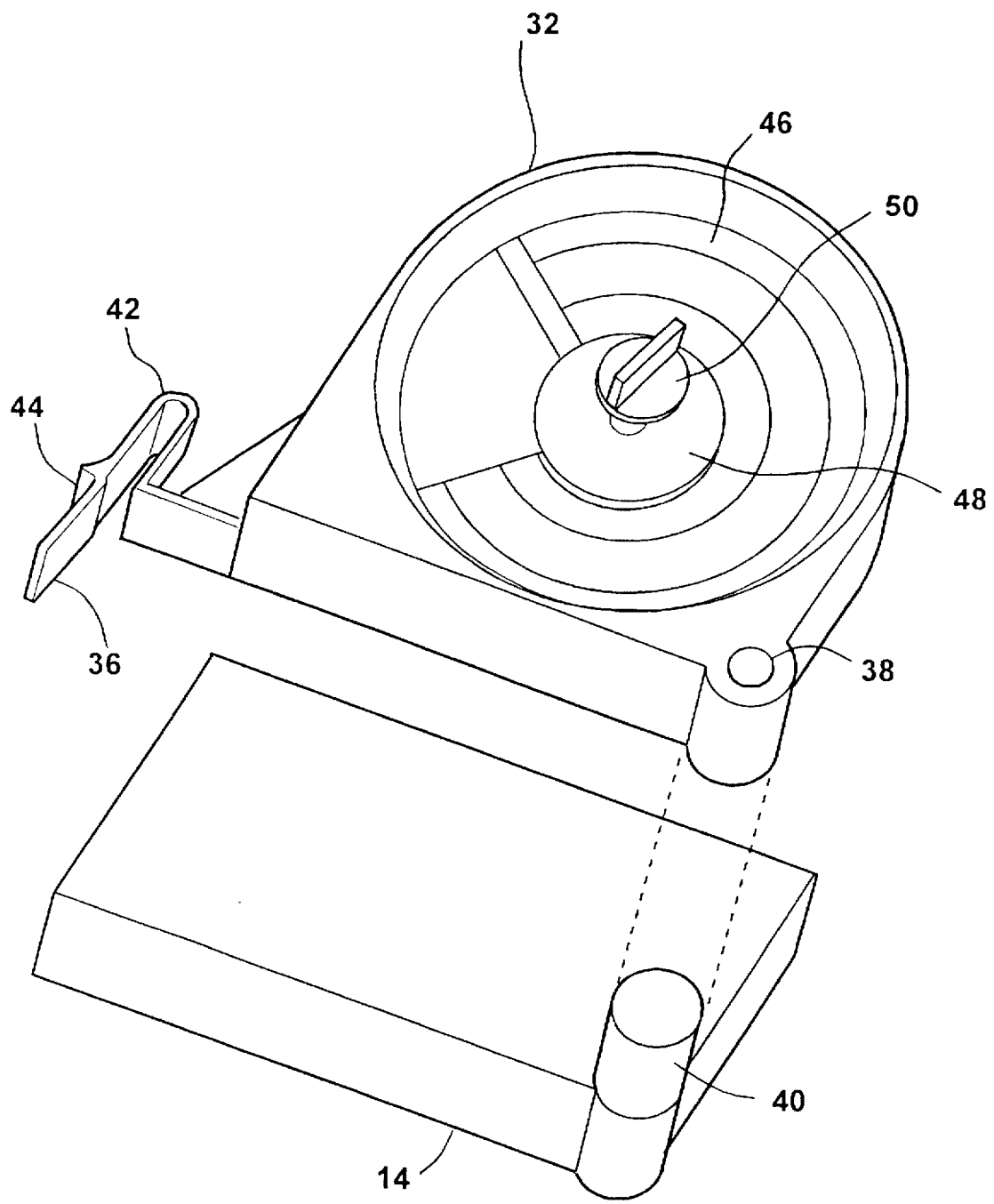
FIG. 3 is a cut away view of the base of the case and of the compartment, according to the present invention.

FIG. 3 shows compartment 32 and a portion of base 14, according to the present invention. It should be noted that base 14 can be any part of case 10 which accommodates compartment 32, when compartment 32 is closed. In this illustration, compartment 32 is shown empty. Compartment 32 has an engagement member 38 attached to it, which is dimensioned to pivotably engage a pivot 40, such that compartment 32 is pivotable about pivot 40. Pivot 40 is attached to base 14. Engagement member 38 can be in the form of a seat, which is either an opening or a recess, and pivot 40 can be in the form of a projection. Alternatively, engagement member 38 can be in the form of a projection, and pivot 40 can be in the form of a seat.

Compartment 32 preferably includes a lock 42. Lock 42 includes a releasable tab 44. Releasable tab 44 releasably engages base 14 (not shown). When releasable tab 44 engages base 14, compartment 32 is held closed, preventing compartment 32 from accidentally moving and potentially spilling out the contents of compartment 32. Holding compartment 32 closed prevents both damage to a blade 34 during storage or transport, and injury to the user from a loose blade 34. Lock 42 is flexible, such that tab 44 may be released by the user, enabling compartment 32 to be pivotable about pivot 40.

Compartment 32 is preferably formed with a plurality of ridges 46, which grip blade 34 and reduce sliding of blade 34. In the preferred embodiment shown, compartment 32 includes a spacer 48, which is preferably a substantially circular disk. Spacer 48 is used to separate two blades 34. One blade 34 may be placed in compartment 32, spacer 48 placed on this blade 34, and a second blade 34 placed on spacer 48. Compartment 32 also preferably includes a tightener 50, which is inserted through an opening in each blade 34, and through a corresponding opening in spacer 48, to engage a seat, which is an opening or a recess, in compartment 32. Tightener 50 is then tightened, so that blades 34 (as shown in FIG. 1) and spacer 48 are securely held against compartment 32.

Figure 4:
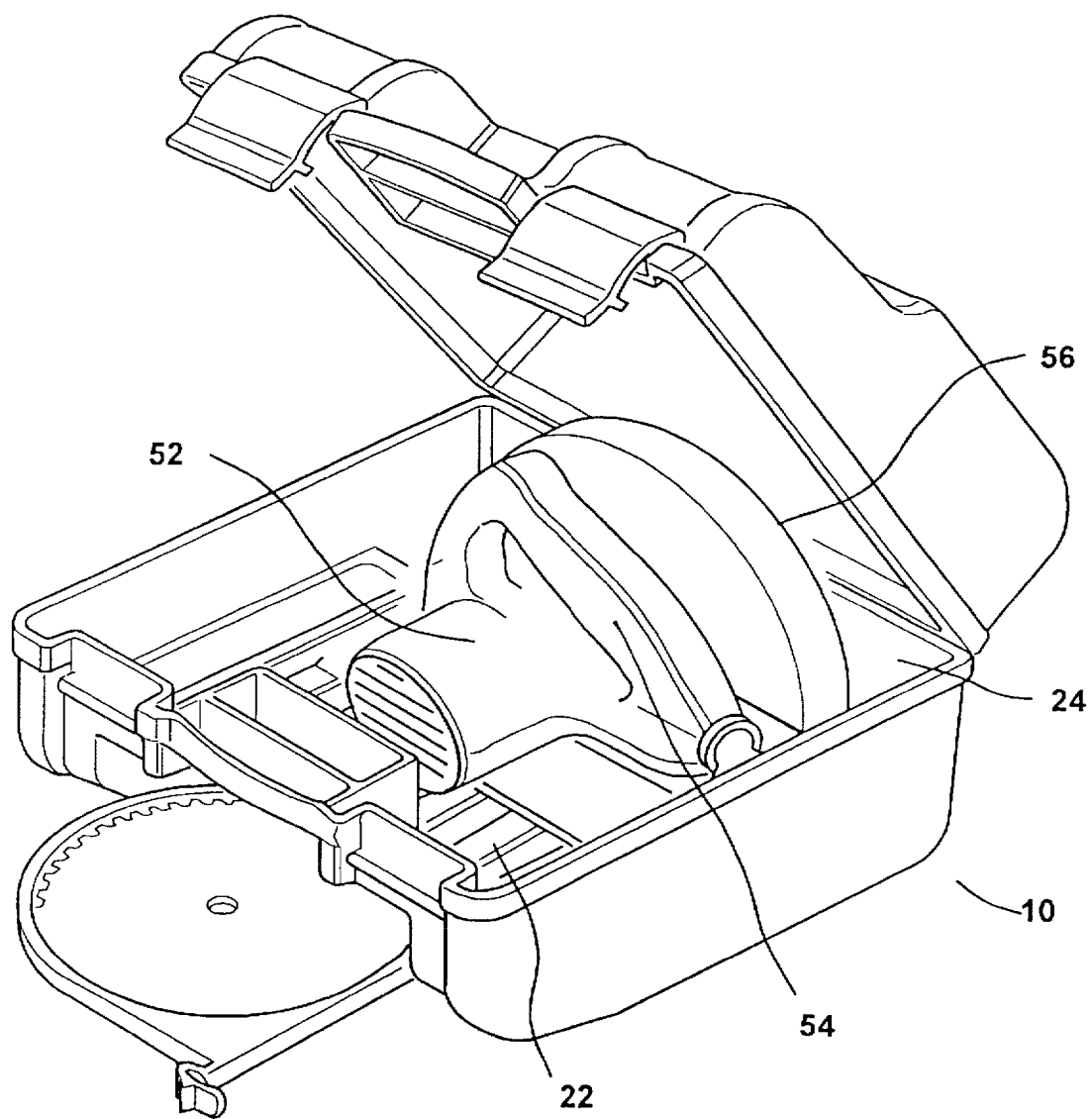
FIG. 4 shows the case of FIG. 1, holding a circular saw.

FIG. 4 shows case 10 of FIG. 1, holding a circular saw. Circular saw 52 is resting within case 10. Handle 54 of saw 52 is resting on platform 22. Blade holder 56 rests substantially within well 24.

While the invention has been described with respect to a limited number of embodiments, it will be appreciated that many variations, modifications and other applications of the invention may be made.

What is claimed is:

1. A case for storing a circular saw and extra blades, comprising:
    (a) a cover;
    (b) a base hingeably connected to said cover, said base featuring a recess; and
    (c) a compartment, said compartment holding at least one of the extra blades in a horizonal position, said compartment being pivotably mounted on said base, and said compartment being dimensioned to be accommodated by said recess, such that when said compartment is closed, at least a portion of said compartment is accommodated by said recess, and when said compartment is open, at least a portion of said compartment projects outwardly, substantially horizontally, from said base, said compartment featuring:
        (i) a seat;
        (ii) a spacer for being able to separate at least two of the extra blades, said spacer including an opening;
        (iii) a tightener for securing said at least one of the extra blades, said tightener being dimensioned to be accommodated by said opening of said spacer and by said seat of said compartment; and
        (iv) a ridge for gripping said at least one of the extra blades.

2. The case of claim 1, wherein the entirety of said compartment is accommodated by said recess when said compartment is closed, and the entirety of said compartment projects outwardly from said base when said compartment is open.

3. The case of claim 1, wherein said compartment holds said at least one of the extra blades having a diameter of substantially seven and one-quarter inches.

4. The case of claim 1, wherein said compartment holds two of the extra blades.

5. The case of claim 1, wherein said compartment further includes a handle attached to said compartment.

* * * * *